(12) United States Patent
Tsukamoto (10) Patent No.: US 9,878,628 B2
(45) Date of Patent: Jan. 30, 2018

(54) POWER SUPPLY DEVICE, VEHICLE AND NON-CONTACT POWER SUPPLY SYSTEM

(71) Applicant: Nissan Motor Co., Ltd., Yokohama-shi, Kanagawa (JP)

(72) Inventor: Yukinori Tsukamoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 93 days.

(21) Appl. No.: 14/778,499

(22) PCT Filed: Mar. 24, 2014

(86) PCT No.: PCT/JP2014/058095
§ 371 (c)(1),
(2) Date: Sep. 18, 2015

(87) PCT Pub. No.: WO2014/157095
PCT Pub. Date: Oct. 2, 2014

(65) Prior Publication Data
US 2016/0288653 A1   Oct. 6, 2016

(30) Foreign Application Priority Data

Mar. 29, 2013   (JP) .................. 2013-072256

(51) Int. Cl.
*H02J 7/00*   (2006.01)
*B60L 11/18*   (2006.01)
(Continued)

(52) U.S. Cl.
CPC ......... *B60L 11/182* (2013.01); *B60L 11/1816* (2013.01); *B60L 11/1825* (2013.01);
(Continued)

(58) Field of Classification Search
CPC   B60L 11/1816; B60L 11/182; B60L 11/1825; B60L 11/1838; B60L 2230/16;
(Continued)

(56) References Cited

U.S. PATENT DOCUMENTS

| 8,810,205 B2 | 8/2014 | Ichikawa | |
| 2011/0031929 A1* | 2/2011 | Asada | H02J 7/0027 320/109 |

(Continued)

FOREIGN PATENT DOCUMENTS

| JP | 11-252810 A | 9/1999 |
| JP | 2003-153456 A | 5/2003 |

(Continued)

*Primary Examiner* — Nathaniel Pelton
(74) *Attorney, Agent, or Firm* — Global IP Counselors, LLP (57) ABSTRACT

A non-contact power supply control unit supplies power in a non-contact manner from a power transmission coil to a power reception coil to charge a battery of a vehicle. A contact power supply unit is electrically connected via a cable to a connection terminal of the vehicle to supply power to its battery. A controller controls the non-contact power supply control unit and the contact power supply unit. When the battery of a first vehicle is being charged by one non-contact power supply system of the non-contact power supply control unit and the contact power supply system of the contact power supply unit, and there is a request from a second vehicle for a power supply by another power supply system, the power supply by one power supply system is continued and the power supply by the other power supply system is put on standby.

3 Claims, 7 Drawing Sheets (51) Int. Cl.
- *H02J 50/90* (2016.01)
- *H02J 17/00* (2006.01)
- *H02J 5/00* (2016.01)
- *H02J 7/02* (2016.01)
- *H02J 50/80* (2016.01)
- *H02J 50/10* (2016.01)

(52) U.S. Cl.
CPC ........... *B60L 11/1838* (2013.01); *H02J 5/005* (2013.01); *H02J 7/025* (2013.01); *H02J 17/00* (2013.01); *H02J 50/10* (2016.02); *H02J 50/80* (2016.02); *H02J 50/90* (2016.02); *B60L 2230/16* (2013.01); *B60L 2250/16* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC ....... B60L 2250/16; H02J 17/00; H02J 50/10; H02J 50/80; H02J 5/005; H02J 7/025

USPC .................................................. 320/108, 109
See application file for complete search history.

(56) References Cited

U.S. PATENT DOCUMENTS

| | | |
|---|---|---|
| 2012/0153717 A1 | 6/2012 | Obayashi et al. |
| 2013/0181669 A1 | 7/2013 | Kawasaki |
| 2015/0069963 A1* | 3/2015 | Ichikawa .................. B60L 1/02 320/108 |

FOREIGN PATENT DOCUMENTS

| | | |
|---|---|---|
| JP | 2012-23825 A | 2/2012 |
| JP | 2013-179723 A | 9/2013 |
| KR | 10-2010-0035152 A | 4/2010 |
| WO | 1998/032209 A1 | 7/1998 |
| WO | 1999/019959 A1 | 4/1999 |
| WO | 2010/131349 A1 | 11/2010 |
| WO | 2012/042902 A1 | 4/2012 |

* cited by examiner

POWER SUPPLY DEVICE, VEHICLE AND NON-CONTACT POWER SUPPLY SYSTEM

This application is a U.S. National stage application of International Application No. PCT/JP2014/058095, filed Mar. 24, 2014, which claims priority to Japanese Patent Application No. 2013-072256 filed in Japan on Mar. 29, 2013. The entire disclosure of Japanese Patent Application No. 2013-072256 is hereby incorporated herein by reference.

BACKGROUND

Field of the Invention

The present invention relates to a power supply device, a vehicle, and a non-contact power supply system.

Background Information

A charger is configured to charge a secondary battery by electrically connecting a power receiving terminal to an AC power source and converting the AC power that is inputted from the power receiving terminal to a predetermined DC power. In addition, a non-contact power receiving unit is configured to receive power from an AC power source in a non-contact manner by being magnetically coupled with a power transmission unit of the AC power source, and the non-contact power receiving unit is connected to a power conversion circuit of the charger. A vehicle charging device that controls a charger by performing the above, and controls a charger to perform charging by comparing the conductive reception power and the non-contact reception power, then using the larger of the conductive reception power and the non-contact reception power based on the comparison result, has been disclosed (See, e.g., International Publication No. 2012-042902).

SUMMARY

However, when a vehicle is charging a battery with one charging system of either a conductive charging or an inductive charging, which performs the charging in a non-contact manner, and another vehicle tries to charge with the other charging system, there is a problem that if the power of the other charging system is greater than the power of the one charging system, the charging of the battery that was being charged first would be interrupted.

The problem to be solved by the present invention is to provide a power supply device, a vehicle, and a non-contact power supply system that, when there is a request to charge by another power supply system while a battery of a vehicle is being charged by one power supply system, prevents the request from restricting the charging with respect to the battery that is being charged.

The present invention solves the problem by continuing the supply of power by one power supply system and putting the supply of power by the other power supply system on standby, when a battery of a first vehicle is being charged by one power supply system of either a non-contact power supply system by a non-contact power supply unit or a contact power supply system by a contact power supply unit, and there is a request to supply power by the other power supply system from a second vehicle.

In the present invention, when there is a request to charge by another power supply system while a battery of a vehicle is being charged by one power supply system, the charging efficiency of the battery that was being charged first will not be decreased by the charging of a battery by the other power supply system; as a result, charging being reduced with respect to the battery that is being charged can be prevented.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below based on the drawings.

First Embodiment

Figure 1:
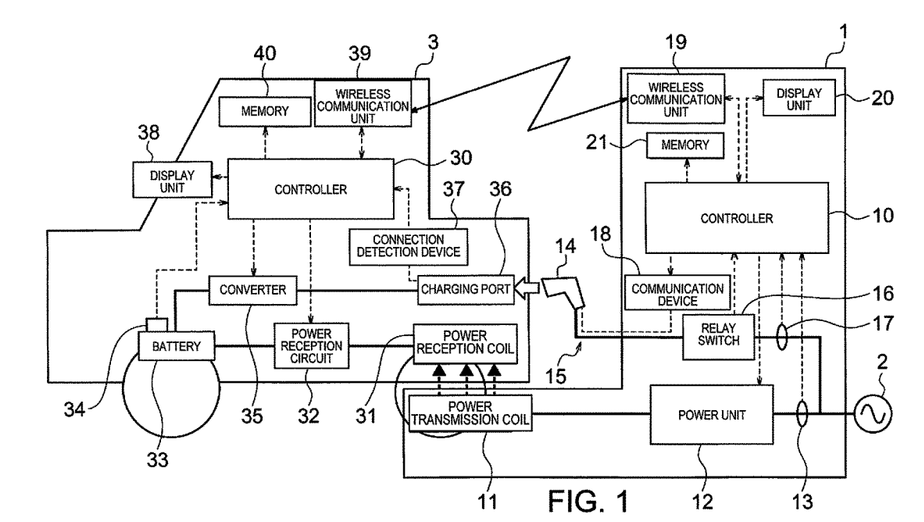
FIG. 1 is a control block diagram of a non-contact power supply system according to an embodiment of the present invention.

FIG. 1 is a block diagram of a non-contact power supply system according to an embodiment of the present invention. The non-contact power supply system of the present embodiment supplies power in a non-contact manner from a power transmission coil 11 of a power supply device provided on the ground side to a power reception coil 31 on the vehicle side, by means of at least a magnetic coupling. The system then charges a battery 33 of the vehicle 3 by the power that is received by the power reception coil 31. The non-contact power supply system is a system that is capable of charging by two systems: a system according to a non-contact power supply, and a system according to a contact power supply. In the contact power supply system method, a charging cable is connected between a power supply device 1 and a charging port 36 of a vehicle 3.

The non-contact power supply systems are provided to the parking facilities, such as the parking spaces of homes, and the shared facilities, such as the parking space of a highway. A non-contact power supply system comprises a vehicle 3 and a power supply device 1. The power supply device 1 is provided to a parking space for parking a vehicle 3, and is a ground side unit that supplies power by a non-contact power supply between the coils, when the vehicle 3 is parked in a predetermined parking position. The vehicle 3 is a vehicle 3 that is capable of charging a battery that is provided in the vehicle by an external power source, such as an electric vehicle or a plug-in hybrid vehicle.

The configuration of the power supply device 1 and the vehicle 3, which configure the non-contact power supply system, will be described below. In the present embodiment, a description will be given of an electric vehicle as the vehicle 3. In FIG. 1, the dotted arrows represent respective signal lines between controllers 10 and 30, and the configuration inside the power supply device 1 and the configuration inside the vehicle 3, while the thick lines represent the power lines when charging a battery 33 with the power of an AC power source 2, representing the power lines of a contact power supply system and the power lines of a non-contact power supply system.

The power supply device 1 comprises a controller 10, a power transmission coil 11, a power unit 12, a current sensor 13, a charging connector 14, a charging cable 15, a relay switch 16, a current sensor 17, a communication device 18, a wireless communication unit 19, a display unit 20, and a memory 21.

The controller 10 is the main controller for controlling the entire power supply device 1.

The power transmission coil 11 is a parallel circular shape coil for supplying power in a non-contact manner to a power reception coil 31, which is provided on the vehicle 3 side, and is provided in a parking space in which is provided the non-contact power supply device of the present embodiment.

The power unit 12 is a circuit for converting the AC power that is transmitted from an AC power source 2 to a high frequency AC power and transmitting the same to the power transmission coil 11, comprising a rectifier, a power factor correction circuit (PFC (Power Factor Correction) circuit), and an inverter. The power unit 12 outputs the desired power to the power transmission coil 11 by having a switching element of the inverter PWM-controlled by the controller 10.

The wiring that is electrically connected to the AC power source 2 is branched into a wiring that is connected to the power unit 12 and a wiring that is connected to the relay switch 16. Then, the current sensor 13 is connected to the branch wiring between the AC power source 2 and the power unit 12, and detects the current that flows from the AC power source 2 to the power unit 12. Additionally, the current sensor 13 detects the current that flows from the AC power source 2 to the power unit 12 when charging the battery 33 of the vehicle 3 by the non-contact power supply system. The detection value of the current sensor 13 is outputted to the controller 10.

The charging connector 14 is a connector for connecting to the charging port 36 of the vehicle 3, the charging connector 14 is provided to one end of the charging cable 15. The charging connector 14 becomes the output of a charging circuit on the power supply device side, which configures the contact power supply system. Additionally, a release switch that can be operated by the user is provided to the charging connector 14. Then, the charging port 36 and the charging cable 15 are electrically connected by the charging connector 14 being fitted to the charging port 36 and the release switch being turned ON.

The charging cable 15 is a wiring that connects the charging connector 14 and the charging circuit of the contact power supply system inside the power supply device 1. The relay switch 16 is a switch for switching between electric conduction and interruption from the AC power source 2 to the charging connector 14, and is controlled by the controller 10. When charging the battery 33 of the vehicle 3 by the contact power supply system, the relay switch 16 is turned ON.

The current sensor 17 is connected to the branch wiring between the AC power source 2 and the relay switch 16. The current sensor 17 detects the charge that flows from the AC power source 2 to the relay switch when charging the battery 33 by the contact power supply system. The detection value of the current sensor 17 is outputted to the controller 10.

The communication device 18 is connected to the charging connector 14 by a communication line. The communication device 18 is provided with a weak current power source and a switch (for communication). When the charging connector 14 is connected to the charging port 36, the communication line that is connected to the communication device 18 and the communication line on the vehicle side become electrically conductive. These communication lines are signal lines for transmitting and receiving information about the battery 33 and information such as the maximum output current, etc., of the power supply device 1 in a contact power supply system, between the controller 10 and the controller 30, when charging the battery 33 by the contact power supply system. When the communication line on the vehicle side and the communication line on the power supply device side are connected by the charging connector being fitted to the charging port, the weak current power source of the communication device 18 passes the communication lines on the vehicle side and the power supply device side via a switch and joins the switch on the vehicle side (the switch for communication) and the ground.

Then, the applied voltage of the communication line on the vehicle side is changed by switching between the ON and OFF of the communication switch of the communication device 18. Then, the vehicle side controller 30 acquires information from the voltage change accompanying the ON and OFF of the communication switch of the communication device 18. The communication device 18 thereby performs a pulse communication by switching between the ON and OFF of the switch. In the same way, since the voltage of the communication line on the power supply device 1 side is changed by switching between the ON and OFF of the switch on the vehicle side, in a state in which the switch of the communication device 18 is turned ON, information can be transmitted from the vehicle 3 to the power supply device 1 by utilizing this voltage change.

Additionally, the communication device 18 also comprises a function for detecting a connection of the charging connector 14 to the charging port 36 on the power supply device 1 side. When the charging connector 14 is connected to the charging port 36, a voltage drop occurs in the communication line on the power supply device 1 side; as a result, the communication device 18 can detect the connection of the charging connector 14 by detecting the voltage change.

The wireless communication unit 19 is a transceiver that performs bidirectional communication with a wireless communication unit 39 that is provided on the vehicle 3 side. A frequency that is different from the frequency that is used in the vehicle peripherals, such as the intelligence keys, is set as the communication frequency between the wireless communication unit 19 and the wireless communication unit 39 so that the vehicle peripherals are less susceptible to interference by the communication even if communication is performed between the wireless communication unit 19 and the wireless communication unit 39. For example, various wireless LAN systems are used for the communication between the wireless communication unit 19 and the wireless communication unit 39. The wireless communication by the wireless communication units 19 and 39 is used for the charging control by the non-contact power supply system.

The display unit 20 is a display for displaying the state of the charging control by the contact power supply system and the charging control by the non-contact power supply system, and is provided on the surface of the chassis of the power supply device 1.

The memory 21 is a recording medium for recording the identification information such as a registration number of the power supply device 1, the identification information of the vehicle 3 that is acquired from the vehicle side by the non-contact power supply, and the rated current value that can be outputted from the AC power source 2, and the like.

The configuration of the vehicle 3 is described next. The vehicle 3 comprises a controller 30, a power reception coil 31, a power reception circuit 32, a battery 33, a sensor 34, a converter 35, a charging port 36, a connection detection device 37, a display unit 38, a wireless communication unit 39, and a memory 40.

The controller 30 is not limited to the charging control when charging the battery 33, and performs various controls in the EV system of a vehicle 3.

The power reception coil 31 is provided on the bottom surface (chassis), etc., of the vehicle 3 between the rear wheels. Then, when the vehicle 3 is parked in a predetermined parking position, the power reception coil 31 is positioned above the power transmission coil 11, while maintaining the distance from the power transmission coil 11. The power reception coil 31 is a circular shaped coil that is parallel to the surface of the parking space.

The power reception circuit 32 is connected between the power reception coil 31 and the battery 33, and comprises a circuit and a relay switch for converting the AC power that is received by the power reception coil to DC power. The relay switch switches between ON and OFF based on a control of the controller 30. When charging the battery 33 by a non-contact power supply, the relay switch is turned ON.

The battery 33 is a secondary battery that outputs, via an inverter that is not diagrammed, power to a motor (not shown), which is the power source of the vehicle 3. The battery 33 is configured by connecting a plurality of secondary batteries, such as lithium-ion batteries, in series or in parallel. The battery 33 is electrically connected to the power reception coil 31 via the power reception circuit 32. The battery 33 is connected to the converter 35.

The sensor 34 is a sensor for detecting the state of the battery, and detects the input current and the input voltage to the battery 33, while the battery 33 is being charged. The detection values of the sensor 34 are outputted to the controller 30. The controller 30 manages the battery 33 based on the detection value of the sensor 34.

The converter 35 comprises a conversion circuit for converting the power that is outputted from the power supply device 1 via the charging port 36 and the charging cable 15 to a DC power, a rectifier, and a smoothing circuit, etc.

The charging port 36 is a terminal for connecting the charging connector 14. When charging the battery 33 by the contact power supply system, the charging connector 14 that is connected to the power supply device 1 is connected to the charging port 36. The charging port 36 is provided in front of the vehicle 3, but the charging port 36 is drawn in the rear of the vehicle 3 in FIG. 1, for ease of illustration.

The connection detection device 37 is a device for detecting the connection of the charging connector 14 to the charging port 36.

The display unit 38 is provided, for example, to the instrument panel of the vehicle 3 and displays a map in a navigation system, and also displays a guide screen for charging, when charging the battery 33 with the power supply device 1.

The wireless communication unit 39 is a communication transceiver for performing wireless communication with the wireless communication unit 19 on the power supply device 1 side. The memory 40 is a recording medium for recording the identification information such as the registration number that is registered for each vehicle in advance.

The control of the non-contact power supply system will be described next. As described above, the power supply device 1 of the present embodiment is a power supply device 1 comprising two power supply systems of a charging control by a contact power supply system and a charging control by a non-contact power supply system. The control of the controllers 10 and 30 upon charging by the non-contact power supply system will be described first.

When the vehicle 3 is parked in a parking space provided with the power supply device 1, the power reception coil 31 faces the power transmission coil 11. When the positional displacement between the power reception coil 31 and the power transmission coil 11 is large, the efficiency of the non-contact power supply drops. Accordingly, the controller 10 detects the relative position of the power reception coil 31 with respect to the power transmission coil 11 with a sensor such as a camera (not shown), and displays an indication urging to re-park on the display unit 20, when the positional displacement between the power reception coil 31 and the power transmission coil 11 is outside of the allowable range.

When the positional displacement between the power reception coil 31 and the power transmission coil 11 is within the allowable range, the controller 10 transmits a signal with the wireless communication unit 19 indicating that use of the non-contact power supply is possible. The controller 30 notifies the user with a guide screen for performing the non-contact power supply use, for example, a display unit 38, based on the signal.

When an operation for performing the non-contact power supply is performed by the user, the controller 30 transmits a request signal for performing the charging by the non-contact power supply to the power supply device 1. The identification information of the vehicle 3 is included in the request signal. When the request signal is received by the wireless communication unit 19, the controller 10 records the identification information included in the request signal to the memory 21. In addition, the controller 10 performs the control to not accept charging by the contact power supply system when being charged by the non-contact power supply system, by stopping the pulse communication by the communication device 18. At this time, the controller 10 displays on the display unit 20 that charging cannot be performed by the contact power supply system.

The controller 10 transmits an acceptable signal, which indicates that preparation has been made for accepting a charge by the non-contact power supply system, to a vehicle that is stopped in the parking space.

The controller 10 transmits the power of the AC power source 2 from the power transmission coil 11 via the power unit 12, by turning the relay switch 16 OFF and controlling the power unit 12.

The controller 30 converts the power that is transmitted from the power transmission coil 11 to the power reception coil 31 to a power that is suitable for charging the battery 33 and outputs the same to the battery 33, by controlling the power reception circuit 32 after receiving the acceptable signal. The battery 33 is thereby charged by the non-contact power supply system.

Additionally, the controller 30 manages the state of the battery 33 during the charging of the battery 33, by detecting the state of the battery with a sensor 34. Then, the controller 30 controls the power reception circuit 32 in accordance with the state of the battery, and adjusts the charging power to the battery 33. When changing the power that is transmitted from the power transmission coil 11, the controller 30 transmits a signal indicating the required power from the power transmission coil 11 to the power reception coil 31 or the state of the battery 33 to the power supply device 1 with the wireless communication unit 39. Then, the controller 10 adjusts the power that is transmitted from the power transmission coil 11 by controlling the power unit 12 based on the information indicating the required power from the vehicle side or the state of the battery 33, by receiving the signal.

Then, when the charge state of the battery (State of Charge) reaches a target SOC, the controller 30 transmits a signal indicating a request to stop the non-contact power supply to the power supply device 1, in order to stop the charging of the battery 33. The controller 10 stops the operation of the power unit 12 and stops the power supply by the non-contact power supply system, by receiving a stop request signal from the vehicle 3.

Additionally, when stopping the charging of the battery 33 in mid-course, the controller 30 transmits a signal indicating a request to stop the non-contact power supply to the power supply device 1, based on, for example, an operation by the user or the like. In the same way, the controller 10 stops the power supply by the non-contact power supply system based on the stop request signal.

The operation of the charging control by the non-contact power supply system can be performed on the power supply device 1 side as well. For example, when a stop switch (not shown) provided on the power supply device 1 side is turned ON by the user, the controller 10 stops the operation of the power unit 12 and stops the power supply from the power supply device 1. In addition, the controller 10 transmits a stop signal indicating to stop the power supply to the vehicle side. The controller 30 controls the power reception circuit 32 to stop the supply of the power to the battery 33 by receiving the stop signal with the wireless communication unit 39. The controllers 10 and 30 thereby stop the charging of the battery 33 by the non-contact power supply system.

The controller 10 restarts the pulse communication by the communication device 18 after stopping the power supply by the non-contact power supply system. In addition, the controller 10 displays on the display unit 20 that the state is a contact power supply possible state, to indicate that the charging can be performed by the contact power supply system.

The control of the controllers 10 and 30 upon charging by the contact power supply system will be described next.

When the charging connector 14 is connected to the charging port 36, the connection detection device 37 transmits a detection signal indicating that the connection of the charging connector 14 has been detected, to the controller 30 on the vehicle side. In addition, the vehicle side controller 10 also detects the connection of the charging connector 14 to the charging port 36, with the communication device 18. The controller 10 then turns the relay switch 16 ON. In addition, the controller 10 controls the communication device 18 to transmit the current value that can be outputted from the charging connector 14 by a pulse communication. At this time, since the power supply by the non-contact power supply system is not being performed, the current value that can be outputted becomes the maximum current value.

After confirming the connection of the charging connector 14 to the charging port 36, the controller 30 detects the output of the communication device 18 by a pulse communication. Then, by detecting the output from the communication device 18, the controller 30 acquires the current value that is inputted to the vehicle side by the contact power supply.

As described above, when charging the battery 33 by the non-contact power supply system, the pulse communication of the communication device 18 is stopped; otherwise, the state is one in which the pulse communication can be outputted. Accordingly, if the charging connector 14 is connected to the charging port 36 in a state in which a restriction for charging by the non-contact power supply system is not being performed, the communication device 18 enters a state in which a signal can be transmitted to the vehicle side via the charging cable 15 and the charging connector 14.

Then, the controller 30 controls the converter 35 and starts to charge the battery 33 based on a charge start operation by the user. During the charging of the battery 33, the controller 30 manages the state of the battery 33 based on the detection value of the sensor 34. Then, when the SOC of the battery 33 reaches the target SOC, or, when there is a charge stop operation by the user, the controller 30 controls the converter 35 and causes the supply of power to the battery 33 to be stopped.

By detecting that the charging connector 14 has been removed from the charging port 36 after the charging of the battery 33 is completed, the controller 10 confirms the charge stop of the battery 33 by the power supply system and turns the relay switch 16 OFF.

The control of the controllers 10 and 30 described above was described regarding the control when the battery 33 is being charged by one power supply system, of either the contact power supply system or the non-contact power supply system. Since the power supply device 1 of the present embodiment has two power supply systems, there is a demand to utilize the other power supply system when the charging of the battery 33 is being controlled by one power supply system, as illustrated in FIG. 1.

Figure 2:
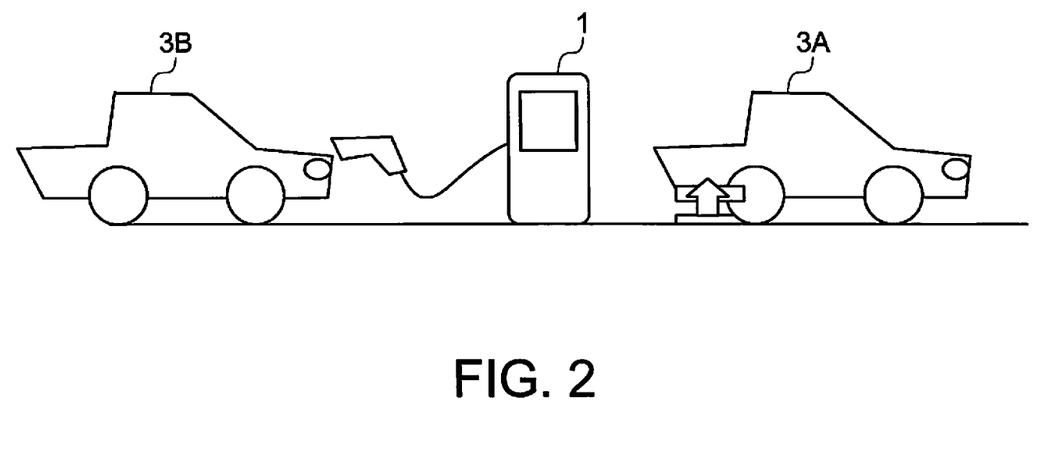
FIG. 2 is a schematic view illustrating the positional relationship and the connection state of the vehicle and the power supply device in FIG. 1.

FIG. 2 is a schematic view illustrating the state of the power supply device 1 and the vehicle 3, when there is a request to utilize the other power supply system while a battery 33 is being charged by one power supply system.

For example, it is assumed that a vehicle 3A is stopped in a parking space of the power supply device 1, the power reception coil 31 is in a position facing the power transmission coil 11, and the battery of the vehicle 3A is being charged by the non-contact power supply system, as illustrated in FIG. 2. The case is one in which, in this state, a vehicle 3B, which is another vehicle, stops near the same power supply device 1, and there is a request for a power supply by the contact power supply system from the vehicle 3B to the power supply device 1, by connecting the charging port 36 of the vehicle 3B to the power supply device 1 with the charging cable 15.

When a request is made to the power supply device 1 to utilize the other power supply system while the battery 33 is being charged by one power supply system, a problem would not occur if the required power from each system can be outputted from the power supply device 1, as illustrated in FIG. 2. However, due to the rating of the AC power source 2 that is connected to the power supply device 1, or, the rating of the harness that configures the charging circuit inside the power supply device 1 or the like, there is an upper limit to the output from the power supply device 1.

Accordingly, in the present embodiment, when there is a request for a power supply by the other power supply system from a vehicle 3 that is different from the vehicle 3 that is being charged during the charging of the battery 33 of the vehicle 3 by one power supply system, of either the non-contact power supply system and the contact power supply system, the power supply by the one power supply system is continued and the power supply by the other power supply system is put on standby. The specific control will be described below.

First, a case in which there is a request for charging by a power supply by the contact system from another vehicle, during the charging of the battery 33 by the non-contact power supply system will be described. When charging the battery 33 by the non-contact power supply system, which is the first power supply system, the controller 10 has stopped the pulse communication of the communication device 18. Then, the stopping of the pulse communication is continued until the charging of the battery 33 by the non-contact power supply system is ended.

Accordingly, even if the charging connector 14 is connected to the charging port 36 of another vehicle, the controller 30 of the other vehicle 3 will not detect a pulse from the communication device 18, and cannot start the charging by the power supply system. Additionally, when detecting the connection of the charging connector 14 to the charging port 36 while the pulse communication of the communication device 18 is stopped, the controller 10 displays on the display unit 20 that the power supply by the contact power supply system is on standby. Then, when the charging of the battery 33 by the non-contact power supply system is ended, the controller 10 restores the pulse communication of the communication device 18; the battery 33 of the other vehicle 3 thereby enters a chargeable state by the contact power supply system.

The controller 10 thereby performs a control so that the charging of the battery 33 by the non-contact power supply system, which is the first power supply system, is continued, while the power supply by the contact power supply system, which is the other power supply system, is put on standby.

Next, a case in which there is a request for charging by a power supply by the non-contact power supply system from another vehicle, during the charging of the battery 33 by the contact power supply system will be described. In the case that a power supply control by the contact power supply system, which is the first power supply system, is being performed, if a request signal for performing charging by the non-contact power supply system is inputted from the vehicle side to the power supply device 1 by wireless communication, the controller 10 continues the power supply by the contact power supply system, by continuing the ON state of the relay switch 16. The controller 10 performs a control so that power is not outputted from the power transmission coil 11 without operating the power unit 12. The power supply by the non-contact power supply system thereby enters a standby state during the power supply by the contact power supply system.

In addition, the controller 10 transmits a signal indicating the standby state of the non-contact power supply to the vehicle side by a wireless communication, as a response signal to the request signal from the vehicle 3. Furthermore, the controller 10 displays the standby state of the non-contact power supply on the display unit 20. On the other hand, when receiving the signal indicating the standby state of the non-contact power supply from the power supply device 1, the controller 30 of the other vehicle displays the standby state of the non-contact power supply on the display unit 38.

When the charging of the battery 33 by the contact power supply system is stopped, the controller 10 on the power supply device side stops the pulse communication by the communication device 18 and wirelessly transmits a signal indicating that charging by the non-contact power supply system is acceptable, to the other vehicle 3. In addition, the controller 10 displays that the power supply by the non-contact power supply system is possible on the display unit 20.

The controller 10 then controls the power unit 12 after transmitting the acceptable signal to start the power supply by the non-contact power supply system. Additionally, the controller 30 on the vehicle side controls the power reception circuit 32 after receiving the acceptable signal, and starts the charging of the battery 33 by the non-contact power supply system.

The controller 10 thereby performs a control so that the charging of the battery 33 by the contact power supply system, which is the first power supply system, is continued, while the power supply by the non-contact power supply system, which is the other power supply system, is put on standby.

Figure 3:
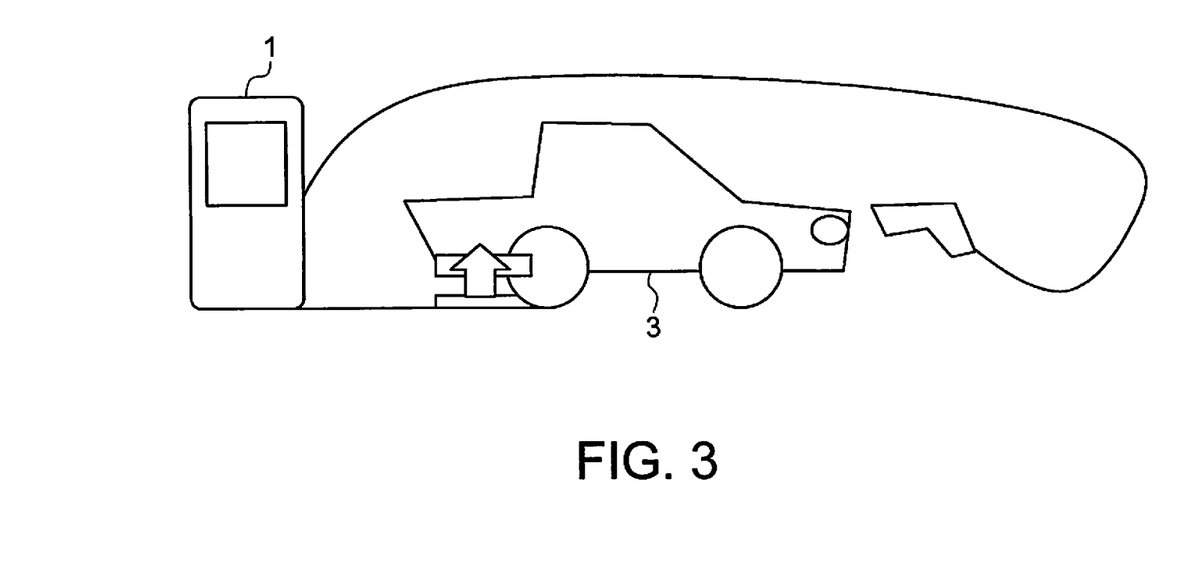
FIG. 3 is a schematic view illustrating the positional relationship and the connection state of the vehicle and the power supply device in FIG. 1.

In addition to FIG. 2, an example of a scene that utilizes the two power supply systems of the power supply device 1 is FIG. 3. FIG. 3 is a schematic view illustrating the state of the power supply device 1 and the vehicle 3, when there is a request to utilize the other power supply system in the same vehicle while a battery 33 is being charged by one power supply system.

For example, it is assumed that a vehicle 3 is stopped in a parking space of the power supply device 1, the power reception coil 31 is in a position facing the power transmission coil 11, and the battery of the vehicle 3 is being charged by the non-contact power supply system, as illustrated in FIG. 3. The case is one in which, in this state, there is a request for a power supply by the contact power supply system from the vehicle 3 to the power supply device 1, by connecting the charging port 36 of the same vehicle 3 to the power supply device 1 with the charging cable 15.

The efficiency of the power supply by the non-contact power supply system is low compared to the efficiency of the power supply by the contact power supply system. Accordingly, there are cases in which, for example, the user of the vehicle 3 has been charging a battery 33 by the non-contact power supply system, but connects the charging connector 14 to the charging port 36 in order to accelerate the charging of the battery 33.

In such a case, unlike the above, the present embodiment stops the power supply by the non-contact power supply system and charges the battery 33 with the power supply by the contact power supply system, when a connection of the charging connector 14 to the charging port 36 is detected during the charging of the battery 33 by the non-contact power supply system. The specific control will be described below.

The vehicle side controller 30 wirelessly transmits a request signal for stopping the power supply by the non-contact power supply system to the power supply device side, when the connection detection device 37 detects that the charging connector 14 has been connected to the charging port 36, during the charging of the battery 33 by the non-contact power supply system. In addition, the controller 30 controls the power reception circuit 32 to stop the supply of the power to the battery 33.

The power supply device side controller 10 stops the pulse communication of the communication device 18 during the charging of the battery 33 by the non-contact power supply system, but restores the pulse communication while stopping the power supply by the non-contact power supply system, by receiving a stop request signal from the vehicle 3.

The controller 30 enters a sleep state after transmitting a stop request signal. The controller 30 detects that the contact power supply is possible by detecting the output from the communication device 18 via the charging cable 15 to be restored from the sleep state. The controller 30 then controls the converter 35 to start the charging of the battery 33.

When detecting that the charging connector 14 has been connected to the charging port 36 during the charging of the battery 33 by the non-contact power supply system, the controller 30 then transmits a request signal for stopping the power supply by the non-contact power supply system and charges the battery 33 with the power that is inputted from the charging port 36.

Figure 4:
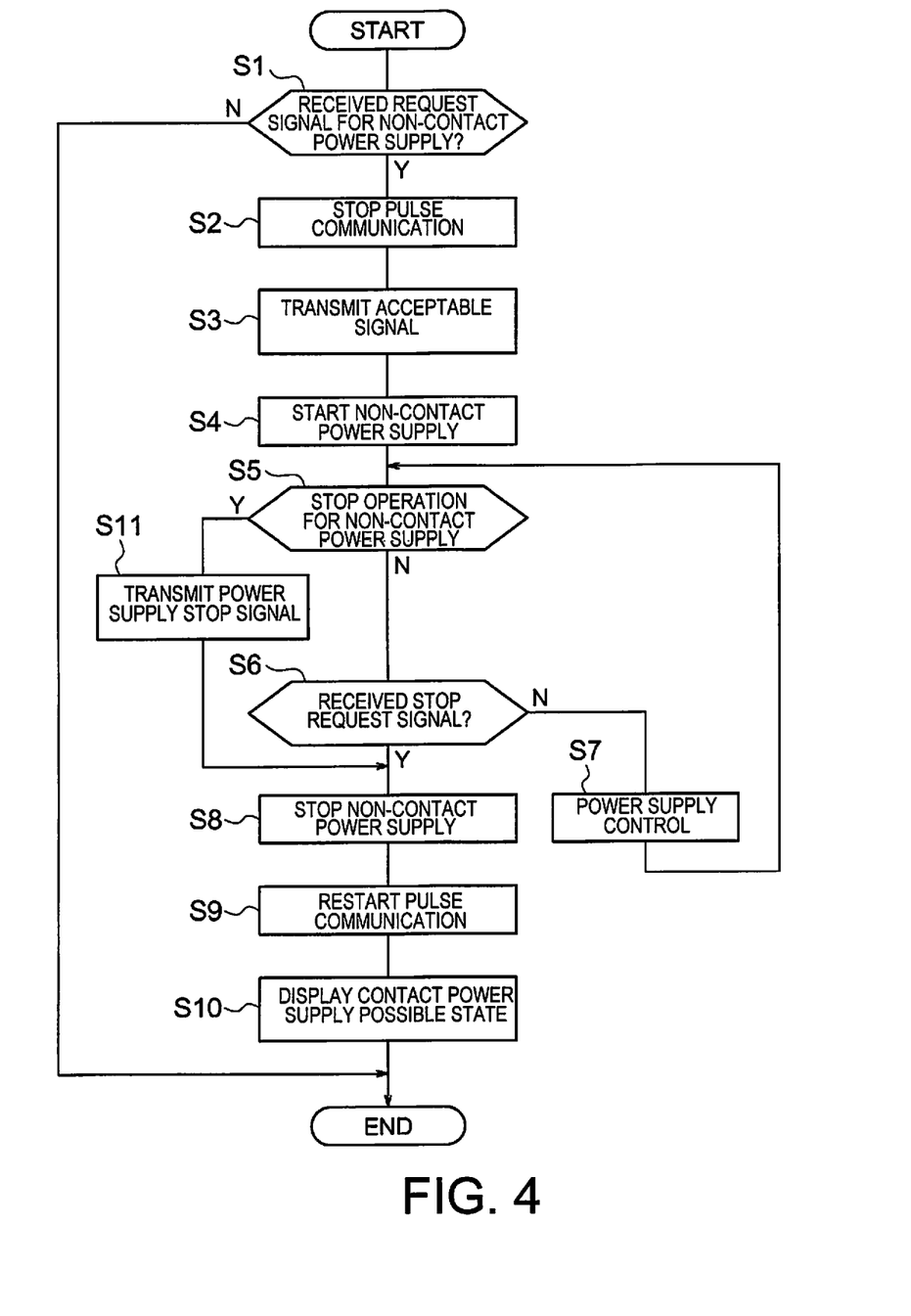
FIG. 4 is a flow chart illustrating the control procedure of the controller on the power supply device side in FIG. 1, when the power supply by the non-contact power supply is started from a state in which the power is not being supplied by two power supply systems.

The control procedure of the controller 10 upon the power supply by the non-contact power supply system will be described next, using FIG. 4. FIG. 4 is a flow chart illustrating the control procedure of the controller 10 on the power supply device side, when the power supply by the non-contact power supply is started from a state in which power is not being supplied by two power supply systems.

The controller 10 on the power supply device side determines whether or not a request signal for the power supply by the non-contact power supply system has been received from the vehicle 3 in step S1, as illustrated in FIG. 4. When a request signal for the power supply by the non-contact power supply system has been received, the control of the present embodiment is ended.

When a request signal for the power supply by the non-contact power supply system has been received, the controller 10 stops the pulse communication of the communication device 18 (step S2). The controller 10 transmits to the vehicle 3 a signal indicating that charging by the non-contact power supply system is acceptable, in step S3.

The controller 10 controls the power unit 12 to start the power supply by the non-contact power supply system, in step S4. The controller 10 determines whether or not there is an operation to stop the power supply by the non-contact power supply system by an operation of the user with respect to the power supply device 1, in step S5. If there is no stop operation, the controller 10 determines whether or not a stop request signal for the non-contact power supply has been received from the vehicle 3, in step S6. If a stop request signal for the non-contact power supply has not been received, the controller 10 controls the power unit 12 to perform a power supply by the non-contact power supply control unit, based on the required power for the vehicle 3 or the information that indicates the state of the battery 33 that is received from the vehicle 3 by the wireless communication unit 19, in step S7. After the control step of step S7, the step returns to step S5.

On the other hand, if a stop request signal has been received in step S6, the controller 10 stops the power supply by the non-contact power supply system in step S8. The controller 10 restarts the pulse communication of the communication device 18, in step S9. The controller 10 displays that the power supply by the contact power supply system is possible on the display unit 20, and ends the control of the present embodiment, in step S10.

Returning to step S5, if there is a stop operation for the power supply by the non-contact power supply system, the controller 10 transmits a power supply stop signal to the vehicle 3 in step S11, and the step proceeds to step S8.

Figure 5:
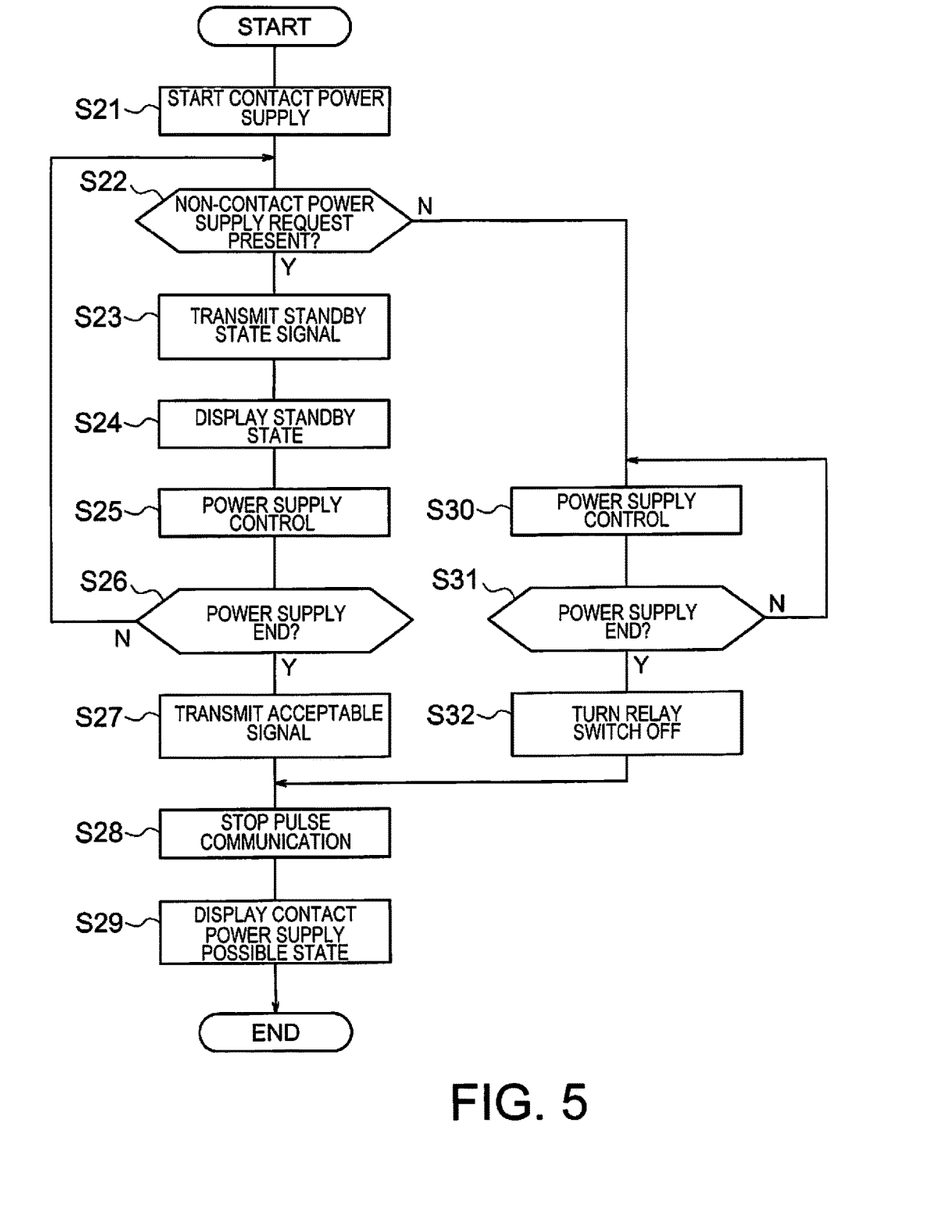
FIG. 5 is a flow chart illustrating the control procedure of the controller on the power supply device side in FIG. 1, when the power supply by the contact power supply is started from a state in which the power is not being supplied by two power supply systems.

The control procedure of the controller 10 upon power supply by the contact power supply system will be described next, using FIG. 5. FIG. 5 is a flow chart illustrating the control procedure of the controller 10 on the power supply device side, when the power supply by the contact power supply is started from a state in which power is not being supplied by two power supply systems.

The controller 10 detects the connection of the charging connector 14 to the charging port 36 and starts the contact power supply, in step S21. The controller 10 determines whether or not there is a request for the power supply by the non-contact power supply system, in step S22. If there is a request for the power supply, the controller 10 transmits a signal indicating a standby state of the non-contact power supply to the vehicle 3, in step S23. The controller 10 displays the standby state of the non-contact power supply on the display unit 20, in step S24. The controller 10 continues the power supply control, by continuing the ON state of the relay switch 16, in step S25. The controller 10 determines whether or not to stop the power supply, in step S26.

When stopping the power supply, the controller 10 turns the relay switch 16 OFF while transmitting a signal indicating that the charging by the contact power supply is acceptable, in step S27. Then, the controller 10 stops the pulse communication of the communication device 18, in preparation for the power supply by the non-contact power supply system, in step S28. The controller 10 displays that the power supply by the non-contact power supply system is possible on the display unit 20, and ends the control of the contact power supply system of the present embodiment, in step S29.

Returning to step S22, where there is no request for the power supply by the non-contact power supply system, the controller 10 performs a power supply control by the contact power supply system, in the same way as the control of step S25, in step S30. The controller 10 determines whether or not to stop the power supply, in the same way as step S26, in step S31. The controller 10 turns the relay switch 16 OFF and ends the power supply by the contact power supply system, in step S32.

If the control of the contact power supply system of the present embodiment is ended in a state in which there is a request for the power supply by the non-contact power supply system in step S22, the step proceeds to the control flow of step S4 illustrated in FIG. 4, and a power supply control of the non-contact power supply system is executed.

Figure 6:
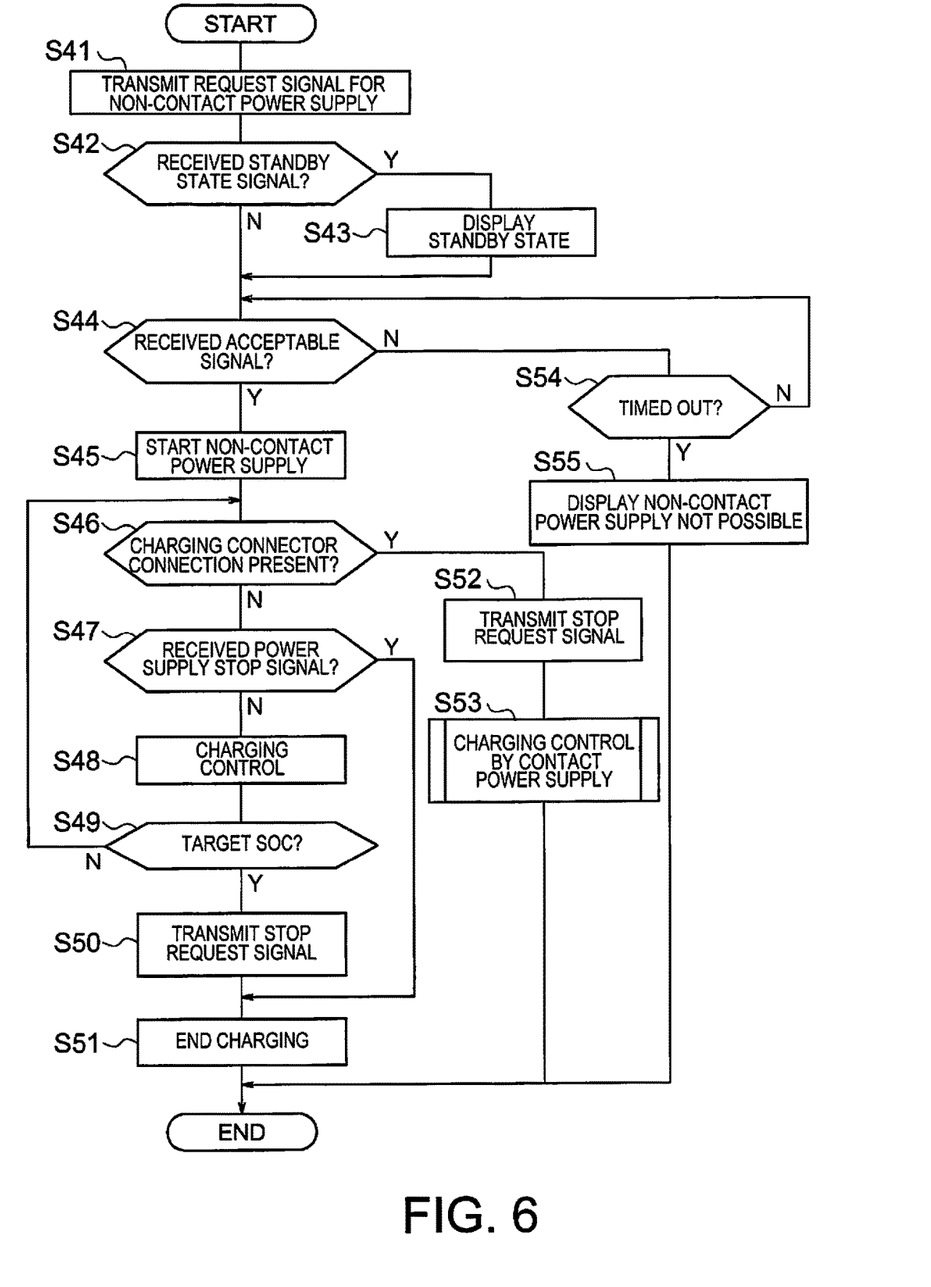
FIG. 6 is a flow chart illustrating the control procedure of the controller on the vehicle side in FIG. 1, when the power supply by the non-contact power supply is started from a state in which the power is not being supplied by two power supply systems.

The control procedure of the controller 30 upon the power supply by the contact power supply system will be described next, using FIG. 6. FIG. 6 is a flow chart illustrating the control procedure of the controller 30 on the vehicle side, when the power supply by the non-contact power supply is started from a state in which power is not being supplied by two power supply systems.

The vehicle side controller 30 transmits a request signal for the power supply by the non-contact power supply system to the power supply device 1, in step S41 (the request signal is received in step S1 of FIG. 4 or step S22 in FIG. 5). The controller 30 determines whether or not a standby state signal has been received, in step S42 (the standby state signal is transmitted in step S23 in FIG. 5). If a standby state signal has been received, the controller 30 displays the standby state of the non-contact power supply on the display unit 38 in step S43, and the step proceeds to step S44. If the controller 30 has not received the standby state signal in step S32, the step proceeds to step S44.

The controller 30 determines whether or not a signal indicating that charging by the contact power supply system is acceptable has been received, in step S44 (the acceptable signal is transmitted in step S27 in FIG. 5). If an acceptable signal has been received, the controller 30 controls the power reception circuit 32 to start the charging by the non-contact power supply, in step S45. The controller 30 determines whether or not there has been a connection of the charging connector 14 to the charging port 36 with the connection detection device 37, in step S46.

If there is no connection of the charging connector 14 to the charging port 36, the controller 30 determines whether or not a power supply stop signal has been received from the power supply device 1, in step S47 (the power supply stop signal is transmitted in step S11 in FIG. 4). If a power supply stop signal has not been received, the controller 30 manages the state of the battery 33 with the sensor 34 while continuing the charging by the non-contact power supply (step S48). The controller 30 determines whether or not the SOC of the battery 33 has reached the target SOC, in step S49. If the SOC has not reached the target SOC, the step returns to step S46.

If the SOC of the battery 33 has reached the target SOC, the controller 30 transmits a stop request signal for the power supply to the power supply device 1, in step S50 (the stop request signal is received in step S6 in FIG. 1). The controller 30 ends the charging by the non-contact power supply in step S51 and ends the control of the present embodiment.

Returning to step S46, if there is a connection of the charging connector 14 to the charging port 36, the controller 30 ends the charging by the non-contact power supply and transmits a stop request signal for the power supply by the non-contact power supply, in order to switch to a charging by the contact power supply (the stop request signal is received in step S6 in FIG. 1). Then, the controller 30 performs a charging control by the contact power supply, in step S53. The detailed flow of the charging control by the contact power supply corresponds to steps S61-S67 in FIG. 7 described below.

Returning to step S44, if a signal indicating that charging by the contact power supply system is acceptable has not been received, the controller 30 determines whether or not a predetermined time has elapsed, in step S54. The predetermined time corresponds to the wait time for the non-contact power supply in a state in which charging by a power supply system is not being performed. That is, the standby state of step S43 is continued until the predetermined time has elapsed, unless the power supply device 1 side enters a state in which charging by the non-contact power supply is acceptable.

On the other hand, if a predetermined time has elapsed (time out), the controller 30 displays that charging by the non-contact power supply system is not possible on the display unit 38 in step S55, and ends the control of the present embodiment.

Figure 7:
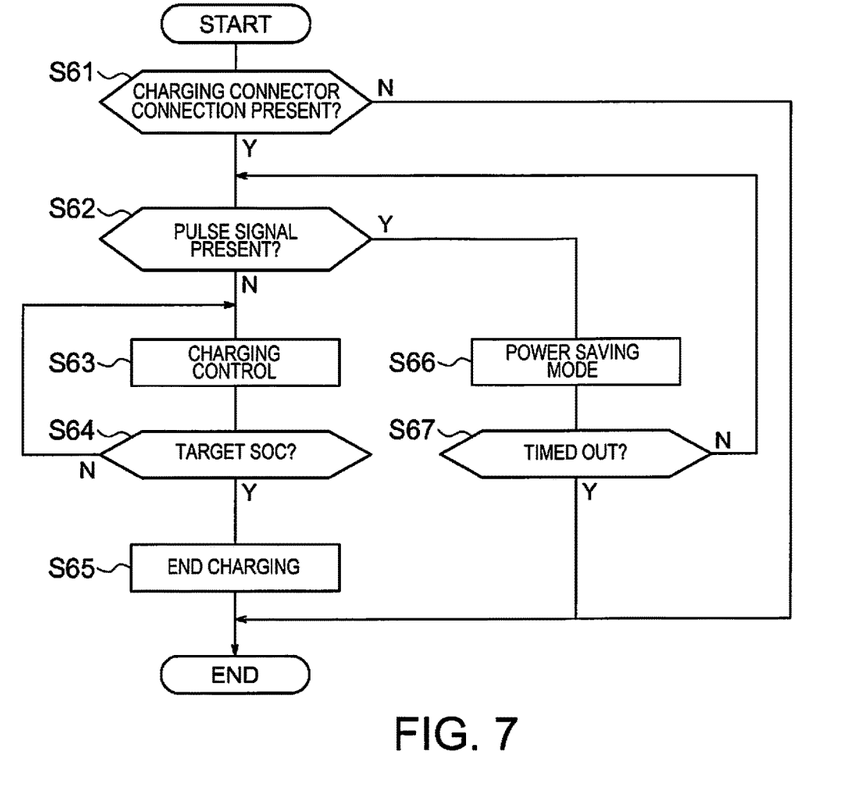
FIG. 7 is a flow chart illustrating the control procedure of the controller on the vehicle side in FIG. 1, when the power supply by a contact power supply is started from a state in which power is not being supplied by two power supply systems.

The control procedure of the controller 30 upon the power supply by the contact power supply system will be described next, using FIG. 7. FIG. 7 is a flow chart illustrating the control procedure of the controller 30 on the vehicle side, when the power supply by the contact power supply is started from a state in which the power is not being supplied by two power supply systems.

The controller 30 determines whether or not there has been a connection of the charging connector 14 to the charging port 36 with the connection detection device 37, in step S61. If there has been a connection of the charging connector 14 to the charging port 36, the controller 30 determines whether or not a pulse from the communication device 18 has been detected, in step S62. If a pulse has been detected, the controller 30 charges the battery 33 by controlling the converter 35, in accordance with the state of the battery 33, in step S63. The controller 30 determines whether or not the SOC of the battery 33 has reached the target SOC, in step S64. If the SOC of the battery 33 has not reached the target SOC, the step returns to step S63.

If the SOC has reached the target SOC, the controller 30 stops the operation of the converter 35, and ends the charging of the battery 33 by the contact power supply system, in step S65.

Returning to S62, if a pulse from the communication device 18 has been detected, the controller 30 transitions to a power saving mode which reduces power consumption, in step S66. The controller 30 determines whether or not a predetermined time has elapsed, in step S67. If a predetermined time has not elapsed, the step returns to S62. On the other hand, if a predetermined time has elapsed, the control of the present embodiment is ended.

The controller 30 determines whether or not charging by the contact power supply system is possible by the pulse communication of the communication device 18, but the pulse communication is stopped even if the power supply device 1 is not connected to the AC power source 2. Accordingly, a time out time is set in step S67 in FIG. 7, and charging by the contact power supply system is performed if the pulse communication is restored within the set time; if the pulse communication is not restored within the set time, for example, the controller 30 notifies an error message indicating that the charging by the contact power supply cannot be performed on the display unit 38, and ends the control.

As described above, the present invention continues the power supply by one power supply system and puts the power supply by the other power supply system on standby, when a battery of a vehicle is being charged by one power supply system of either a non-contact power supply system by a non-contact power supply unit or a contact power supply system by a contact power supply unit, and there is a request for a power supply by the other power supply system from another vehicle. Thus, if there is a request for a power supply by the other power supply system from another vehicle during charging with one power supply system in a power supply device having two power supply systems, the power supply by the other power supply system is not started until the power supply by the one power supply system is ended. Accordingly, a control is possible so that the charging of the battery of the vehicle that was being supplied power first will not be interrupted, due to a request from the other vehicle.

In addition, the present embodiment notifies the other vehicle that the power supply is in a standby state, if there is a request for a power supply by the other power supply system from the other vehicle, while a battery of a vehicle is being charged by one power supply system. The user of the other vehicle can thereby recognize the standby state of charging.

Additionally, in the present embodiment, when detecting that the charging connector 14 has been connected to the charging port 36 during the charging of the battery 33 by the non-contact power supply system, a request signal for stopping the power supply by the non-contact power supply system is transmitted to the power supply device 1, and the battery 33 is charged with the power that is inputted from the charging port 36. Thus, the contact power supply system can be prioritized in a state in which both the power supply by the non-contact power supply system and the power supply by the contact power supply system can be utilized by the same vehicle. The charging efficiency of the battery 33 can thereby be improved.

The power unit 12 described above corresponds to the "non-contact power supply unit" of the present invention, the charging circuit for the contact power supply system including the relay switch 16 corresponds to the "contact power supply unit" of the present invention, the wireless communication unit 39 corresponds to the "communication means" of the present invention, and the charging port 36 corresponds to the "connection terminal" of the present invention.

The invention claimed is:

1. A power supply device comprising:
   a non-contact power supply unit configured to charge a battery of a vehicle by supplying power from a power transmission coil to a power reception coil in a non-contact manner by at least a magnetic coupling;
   a contact power supply unit electrically connected to a connection terminal that is provided to a vehicle via a cable and supplies power to a battery of the vehicle; and
   a controller configured to control the non-contact power supply control unit and the contact power supply unit, the controller being provided to the power supply device,
   the controller being configured to continue a first power supply by one of the non-contact power supply system and the contact power supply system and put a second power supply by the other of the non-contact power supply system and the contact power supply system on standby, when a battery of a first vehicle is being charged by the first power supply and there is a request for the second power supply from a second vehicle,
   the controller being configured to transmit a signal for stopping the power supply by the non-contact power supply system to the first vehicle, and to charge the battery with the power that is inputted from the connection terminal, when a connector of the cable is connected to the connection terminal of the first vehicle during the charging of the battery of the first vehicle by the non-contact power supply system, and
   the controller being configured to continue the first power supply based on a determination that the first vehicle was being charged before the request was received from the second vehicle.

2. A non-contact power supply system provided with a vehicle comprising the power reception coil and a power supply device,
   the power supply device comprising:
      a non-contact power supply system configured to charge a battery of a vehicle by supplying power from a power transmission coil to a power reception coil in a non-contact manner by at least a magnetic coupling;
      a contact power supply system electrically connected to a connection terminal that is provided to a vehicle via a cable and supplies power to a battery of the vehicle; and
      a controller configured to control the non-contact power supply system and the contact power supply system,
   the vehicle comprising:
      a communication unit being configured to transmit a request signal that requests a power supply to the power supply device by wireless communication;
      a connection terminal configured to be electrically connected to the power supply device via a cable;
      a battery configured to be charged by the power of the power reception coil and the power that is inputted from the connection terminal via the cable; and
      a vehicle side controller configured to control the communication unit, and
   the power supply device side controller being configured to continue a first power supply by one of the non-contact power supply system and the contact power supply system and put a second power supply by the other of the non-contact power supply system and the contact power supply system on standby, when a battery of a first vehicle is being charged by the first power supply and there is a request for the second power supply from a second vehicle,
   the power supply device side controller being configured to continue the first power supply based on a determination that the first vehicle was being charged before the request was received from the second vehicle, and
   the vehicle side controller being configured to transmit a signal for stopping the power supply by the non-contact power supply system, and to charge the battery with the power that is inputted from the connection terminal when detecting that a connector of the cable has been connected to the connection terminal during the charging of the battery by a non-contact power supply system based on the power from the power reception coil.

3. A vehicle comprising:
   a power reception coil configured to receive power in a non-contact manner from a power transmission coil that is provided to a power supply device by at least a magnetic coupling;
   a communication unit being configured to transmit a request signal that requests a power supply to the power supply device by wireless communication;
   a connection terminal configured to be electrically connected to the power supply device via a cable;
   a battery configured to be charged by the power of the power reception coil and the power that is inputted from the connection terminal via the cable; and
   a vehicle side controller configured to control the communication unit,
   the vehicle side controller being configured to continue the charging of the battery while in a state in which there is a request for a power supply from another vehicle to the power supply device during the charging of the battery and in which the power supply of the other vehicle is standing by,
   the vehicle side controller being configured to continue charging the battery while in a state in which there is a request for a power supply from a second vehicle to the power supply device during the charging of the battery and in which the power supply of the other vehicle is standing by,
   the vehicle side controller being configured to continue the charging of the battery based on a determination that the vehicle was being charged before the request was received from the second vehicle, and
   the vehicle side controller being configured to
      transmit a signal for stopping the power supply by the non-contact power supply system, and charge the battery with the power that is inputted from the connection terminal when detecting that a connector of the cable has been connected to the connection terminal during the charging of the battery by a non-contact power supply system based on the power from the power reception coil.

* * * * *